(12) United States Patent
Pillay et al.

(10) Patent No.: US 11,934,855 B2
(45) Date of Patent: Mar. 19, 2024

(54) SYSTEM AND METHOD TO AUTONOMOUSLY MANAGE HYBRID INFORMATION TECHNOLOGY (IT) INFRASTRUCTURE

(71) Applicant: Tata Consultancy Services Limited, Mumbai (IN)

(72) Inventors: Rajan Pillay, Chennai (IN); Gopalakrishnan Ramamoorthy, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 414 days.

(21) Appl. No.: 17/185,841

(22) Filed: Feb. 25, 2021

(65) Prior Publication Data

US 2021/0373927 A1 Dec. 2, 2021

(30) Foreign Application Priority Data

May 28, 2020 (IN) .............................. 202021022476

(51) Int. Cl.
| | |
|---|---|
| *G06F 9/455* | (2018.01) |
| *G06F 9/38* | (2018.01) |
| *G06F 9/4401* | (2018.01) |
| *G06F 9/50* | (2006.01) |

(52) U.S. Cl.
CPC ........ *G06F 9/45558* (2013.01); *G06F 9/3838* (2013.01); *G06F 9/4406* (2013.01); *G06F 9/5077* (2013.01); *G06F 2009/45562* (2013.01); *G06F 2009/4557* (2013.01); *G06F 2009/45595* (2013.01)

(58) Field of Classification Search
CPC .. G06F 9/45558; G06F 9/3838; G06F 9/4406; G06F 9/5077; G06F 2009/45562; G06F 2009/4557; G06F 2009/45595
See application file for complete search history.

(56) References Cited

U.S. PATENT DOCUMENTS

| | | | |
|---|---|---|---|
| 7,890,605 B1* | 2/2011 | Protassov | ........... H04L 12/4641 |
| | | | 709/219 |
| 2016/0019636 A1* | 1/2016 | Adapalli | ................. H04L 67/10 |
| | | | 705/26.81 |

(Continued)

OTHER PUBLICATIONS

Vaibhav Gowadia, Models and framework for Meta-data generation and policy infrastructure, Consequence, 2008 (Year: 2008).*

(Continued)

*Primary Examiner* — Dong U Kim

(74) *Attorney, Agent, or Firm* — FINNEGAN, HENDERSON, FARABOW, GARRETT & DUNNER LLP

(57) ABSTRACT

This disclosure relates to a system and method to autonomously manage hybrid IT infrastructure. An end-to-end, integrated, and autonomous IT infrastructure is suggested to offload the repetitive business as usual (BAU) operational tasks, thereby reducing operational cost, noise, and chaos, improve resiliency, thus improving availability of the business. The autonomous IT infrastructure leads to bring in efficiency to customer business, to reduce incident reduction, optimize cost and to provide insight into any future IT infrastructure need. Herein, one or more key characteristics that make the IT infrastructure autonomous includes auto sensing an environment of the infrastructure, learning the infrastructure behavior, predicting one or more events, determining a course of action, and performing one or more actions with minimal or no human intervention.

7 Claims, 10 Drawing Sheets

(56) References Cited

U.S. PATENT DOCUMENTS

| | | | | |
|---|---|---|---|---|
| 2018/0024851 A1* | 1/2018 | Barker | ................... | H04L 63/08 |
| | | | | 726/7 |
| 2020/0304571 A1* | 9/2020 | Ranjan | .................. | G06F 3/0649 |
| 2020/0403868 A1* | 12/2020 | Punathil | .............. | H04L 41/0823 |
| 2021/0132935 A1* | 5/2021 | Dinh | ..................... | G06F 9/4411 |
| 2021/0232473 A1* | 7/2021 | Laskawiec | .......... | G06F 11/3419 |
| 2021/0263749 A1* | 8/2021 | Laskawiec | .......... | G06F 9/44505 |

OTHER PUBLICATIONS

Sinreich, D., "An architectural blueprint for autonomic computing", Computer Science, 2006, Semantic Scholar, https://www.03.ibm.com/autonomic/pdfs/AC%20Blueprint%White%20Paper%20V7.pdf.

HP Enterprise, "Best Practices for Workload Placement in a Hybrid IT Environment", Data Centre, 2016, Intel, https://www.arrow.com/cloud/-/media/arrowcloud/resources/supplier-content---all-regions/hpe/a00000092enw.pdf.

Nadkarni, Ashish et al., "Workload Placement Separates the Winners from the Losers in IT", White paper, 2019, Express Computer, https://www.express.computer.in/downloads/white-paper/idc-workload-placement-separates-the-winners-from-the-losers-in-it/69106/.

Kenga, Derdus M. et al., "Autonomous Virtual Machine Sizing and Resource Usage Prediction for Efficient Resource Utilization in Multi-Tenant Public Cloud", Information Technology and Computer Science, May 2019, MECS, http://www.mecs-press.org/ijitcs/ijitcs-v11-n5/IJITS-V11-N5-2.pdf.

\* cited by examiner

US 11,934,855 B2

SYSTEM AND METHOD TO AUTONOMOUSLY MANAGE HYBRID INFORMATION TECHNOLOGY (IT) INFRASTRUCTURE

CROSS-REFERENCE TO RELATED APPLICATIONS AND PRIORITY

This U.S. patent application claims priority under 35 U.S.C. § 119 to Indian application No. 202021022476, filed on May 28, 2020. The entire content of the abovementioned application is incorporated herein by reference.

TECHNICAL FIELD

The disclosure herein generally relates to a field of information technology (IT) infrastructure and, more particularly, a system and method to autonomously manage a hybrid IT infrastructure.

BACKGROUND

In the digital era, dependency on technology and IT infrastructure is very high and any disruption on the IT infrastructure leads to a direct business loss. In today's world, growth has been a challenge due to tough competition from traditional players and emerging start-ups are entering the business area. Keeping margin levels higher has been a challenge as the cost of service, salary, and localization costs have been increasing. It would be appreciated that the technology is becoming more and more complex and downtime and availability is becoming a concern.

In current scenario, organizations are relying on human to navigate and manage the complex environment and the IT operations team spend considerable time to manage effectively. Moreover, it is non-trivial that the scale and skills required to support the new generation of IT technology infrastructure to support ever growing business services. Additionally, deciding the right choice of deployment strategies such as hybrid deployment models among on-premise, multi-cloud or edge, deciding right hardware choices, software defined against hyper converged, virtual machines against containers and the actual deployment has varied time consumption based on complexity of the business applications.

SUMMARY

Embodiments of the present disclosure provides technological improvements as solutions to one or more of the abovementioned technical problems recognized by the inventors in conventional systems. For example, in one embodiment, a system and a method to autonomously manage a hybrid information technology (IT) infrastructure. Throughout the discussion of example embodiments, it should be understood that the terms "IT infrastructure", "Hybrid Infrastructure" and "infrastructure" are used interchangeably herein to refer the hybrid information technology infrastructure that can exist in a computer-based environment, composed of a combination of on-premises data centers, private clouds and/or public clouds and/or edge platforms.

In one aspect, a processor-implemented method to autonomously manage a hybrid IT infrastructure. Herein, an end-to-end integrated and autonomous infrastructure is suggested to offload the repetitive business as usual (BAU) operational tasks. The autonomous IT infrastructure configured to self-learn relationship among one or more IT components, understand the application pattern and the context to bring in efficiency to the customer business, to optimize operations cost and to provide insight into any future IT infrastructure procurement. The autonomous IT infrastructure drives itself by setting service-level policies for the workloads and further defining them with existing performance levels and data protection policies.

The method comprises one or more steps as collecting one or more information of an existed IT infrastructure using a discovery model. Herein, the one or more information includes capacity of one or more components, configuration of one or more software installed on server, and connectivity of the IT infrastructure. The collected one or more information is analyzed based on one or more parameters to identify type of infrastructure, processes of one or more software, and a plurality of configuration files and directories of the IT infrastructure. The one or more parameters include, but not limited to, lookup running processes, an installed path of running processes, a network bindings and server/client connections of running processes, an installed paths mapping to computer file system and drive. Based on the analysis of the collected one or more information, a blueprint of an IT infrastructure is created for a business application in a domain like for example retail, banking, etc. Further, the method comprises triggering a blueprint deployment for provisioning the created blueprint of the IT infrastructure, deploying the validated blueprint of the IT infrastructure, and determining the workload placement on one or more instances of the developed IT infrastructure. It is to be noted that the provisioning includes verification of one or more applications of the infrastructure to determine capacity, data sensitivity, and localization requirement for each of one or more applications of the IT infrastructure.

Furthermore, the method comprises monitoring the deployed infrastructure and one or more applications using an artificial intelligence enabled monitoring model to detect one or more operational issues and optimizing the deployed IT infrastructure based on result of monitoring of the IT infrastructure.

In another aspect, a system is configured to create a blueprint for auto provisioning in a hybrid infrastructure. The system comprising an input/output interface for collecting one or more information of an information technology (IT) infrastructure using a discovery module. The one or more information includes at least one infrastructure platform, at least one environment for one or more applications, and capacity, configuration, and connectivity of each of one or more components of the IT infrastructure. Further, the system includes at least one user interface, at least one application programming interface, one or more hardware processors and at least one memory in communication with the one or more hardware processors. The one or more hardware processors are configured to execute one or more programmed instructions stored in the memory.

The system is configured to analyze the collected one or more information of the IT infrastructure to identify type of IT infrastructure, and for capturing possible geographical location of the IT infrastructure, operating and non-operating software processes, at least one platform software, and a plurality of configuration files and directories. Further, the system is configured to create a blueprint of one or more components of the business application IT infrastructure based on the analysis of collected one or more information. The one or more components pertaining to at least one business application in a specific domain like for example Retail, Banking, etc., It is to be noted that the blueprint is created for an environment, which includes at least one operating software, one or more platform software, contents of the configuration files and directories. Further, the system is configured to trigger a blueprint deployment for provisioning the created blueprint of the IT infrastructure, to deploy the provisioned blueprint of the IT infrastructure along with required business application, and determine a workload placement on one or more instances of the deployed IT infrastructure.

Furthermore, the system is configured to monitor the deployed IT infrastructure using an artificial intelligence (AI) enabled monitoring module. Herein, the monitoring includes detection of one or more operational issues, advanced alerting, and noise reduction. Further, the system is configured to detect one or more operational issues and optimize the deployed IT infrastructure based on result of monitoring. It would be appreciated that the optimization comprises performing right sizing on the compute, and storage to improve resource efficiency and transform one or more applications running in virtual machines into containers.

Herein, the optimization includes moving the workload from one location to another, say on-premises to cloud, cloud to on-premises, cloud to cloud, based on multiple factors including, environment category (example, Test, Development, SIT, Quality and Production), required infrastructure (example, CPU, TPU, GPU, FPU, etc.), storage capacity, past capacity utilization trends, licenses, cloud pricing, data sensitivity, data locality, available capacity, end user regions, etc. Further, the optimization includes transform virtual machine-based application into a container-based application for better optimization on the infrastructure resources, performance and operating systems license savings.

In yet another embodiment, a non-transitory computer readable medium storing one or more instructions which when executed by a processor on a system cause the processor to perform a method. The method comprises one or more steps as collecting one or more information of an existed IT infrastructure using a discovery model. Herein, the one or more information includes capacity of one or more components, configuration of one or more software installed on server, and connectivity of the IT infrastructure. The collected one or more information is analyzed based on one or more parameters to identify type of infrastructure, processes of one or more software, and a plurality of configuration files and directories of the IT infrastructure. The one or more parameters include, but not limited to, lookup running processes, an installed path of running processes, a network bindings and server/client connections of running processes, an installed paths mapping to computer file system and drive. Based on the analysis of the collected one or more information, a blueprint of an IT infrastructure is created for a business application in a domain like for example retail, banking, etc. Further, the method comprises triggering a blueprint deployment for provisioning the created blueprint of the IT infrastructure, deploying the validated blueprint of the IT infrastructure, and determining the workload placement on one or more instances of the developed IT infrastructure. It is to be noted that the provisioning includes verification of one or more applications of the infrastructure to determine capacity, data sensitivity, and localization requirement for each of one or more applications of the IT infrastructure.

Furthermore, the method comprises monitoring the deployed infrastructure and one or more applications using an artificial intelligence enabled monitoring model to detect one or more operational issues and optimizing the deployed IT infrastructure based on result of monitoring of the IT infrastructure.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes, which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a method and a system to autonomously manage a hybrid IT infrastructure. Herein, an end-to-end, integrated, and autonomous IT infrastructure is suggested to offload the repetitive business as usual (BAU) operational tasks, thereby reducing noise and chaos. The autonomous IT infrastructure leads to bring in efficiency to customer business, to optimize cost and to provide insight into any future IT infrastructure expansion, to bring resiliency to the critical business applications with maximum uptime. Herein, one or more key characteristics that make the IT infrastructure autonomous includes auto sensing an environment of the infrastructure, learning the infrastructure behavior, predicting one or more events, determining a course of action, and performing one or more actions with minimal or no human intervention.

Figure 10:
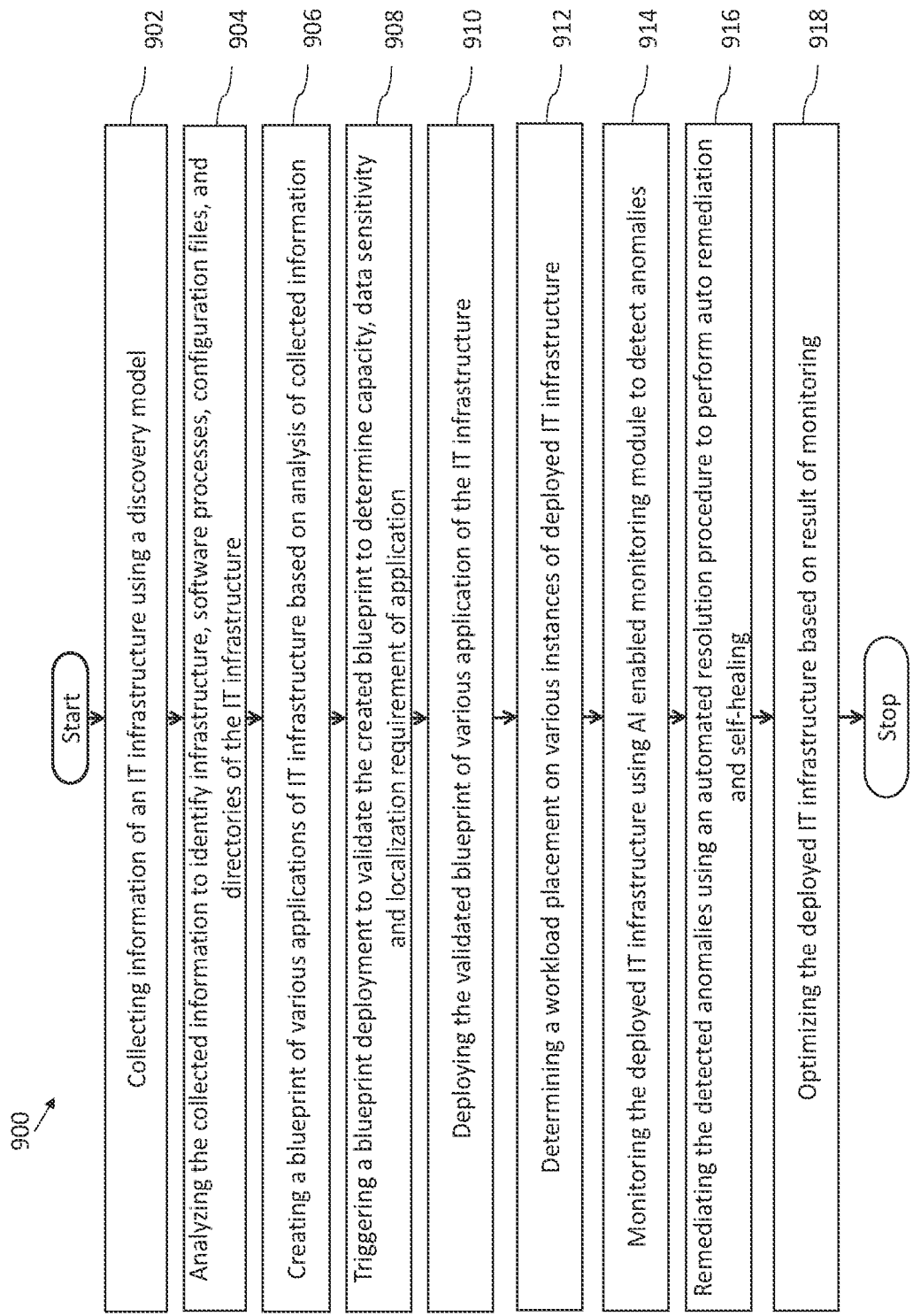
FIG. 10 is a flow diagram to illustrate a method to manage an IT infrastructure autonomously, in accordance with some embodiments of the present disclosure.

Referring now to the drawings, and more particularly to FIG. through FIG. 10, where similar reference characters denote corresponding features consistently throughout the figures, there are shown preferred embodiments and these embodiments are described in the context of the following exemplary system and/or method.

Figure 1:
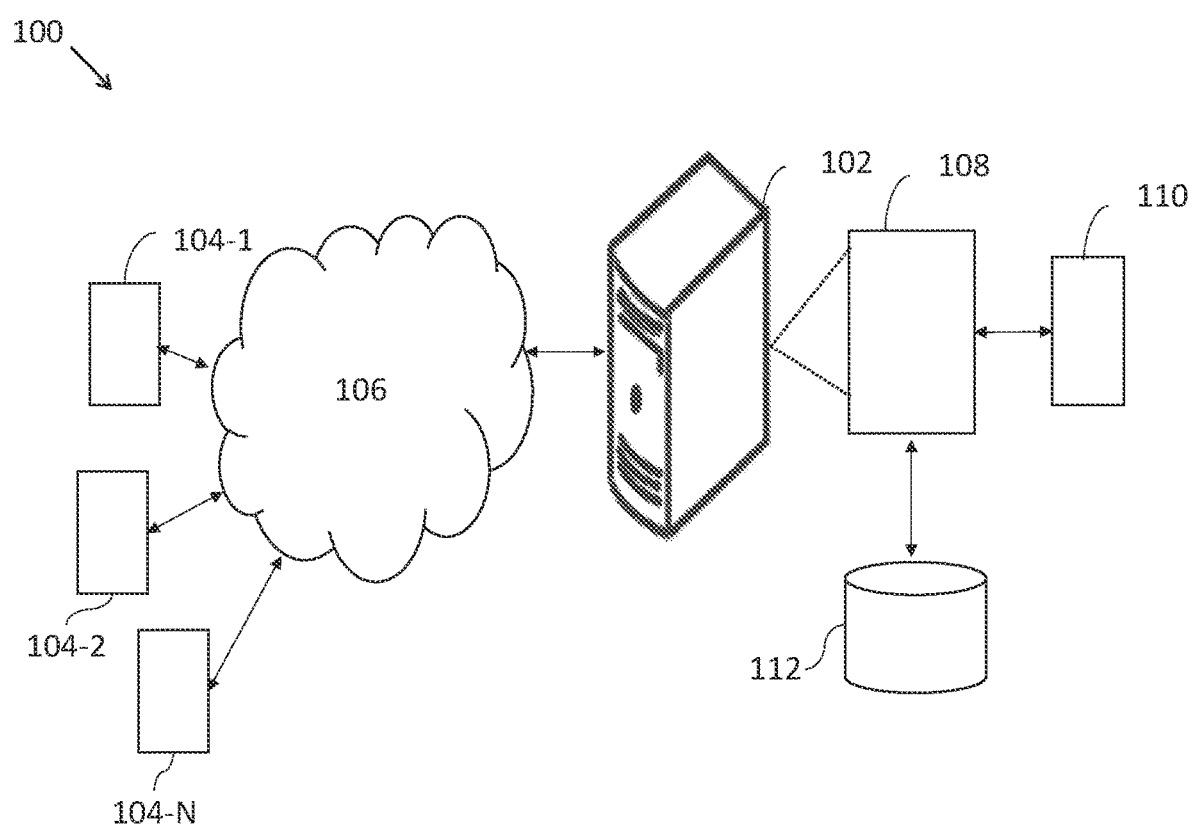
FIG. 1 illustrates a block diagram of an exemplary system to autonomously manage a hybrid IT infrastructure, according to some embodiments of the present disclosure.

FIG. 1 illustrates a block diagram of a system 100 to autonomously manage a hybrid IT infrastructure, in accordance with an example embodiment. Although the present disclosure is explained considering that the system 100 is implemented on a server, it may be understood that the system 100 may comprises one or more computing devices 102, storage, network devices, and other services a cloud-based computing environment and the like. It will be understood that the system 100 may be accessed through one or more input/output interfaces 104-1, 104-2 . . . 104-N, collectively referred to as I/O interface 104. Examples of the I/O interface 104 may include, but are not limited to, a user interface, a server and the like. The I/O interface 104 are communicatively coupled to the system 100 through a network 106. It is to be noted that the at least one user interface 104 of the system 100 is a dashboard for one or more user roles configured to interact with the IT infrastructure. The dashboard comprises one or more views and one or more options depending on role of each of the one or more users. One option is a service catalogue to provide a menu list of services.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 may be implemented in a workstation, a server, and a network server. In an embodiment, the computing device 102 further comprises one or more hardware processors 108, one or more memory 110, hereinafter referred as a memory 110 and a data repository 112, for example, a repository 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100.

The network environment enables connection of various components of the system 100 using any communication link including Internet, WAN, MAN, and so on. Further, the system supports at least one application programming interface (API) 114. It is to be noted that the system is flexible enough to use any choice and combination of tools provided to support API mechanism for integration. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

Figure 2:
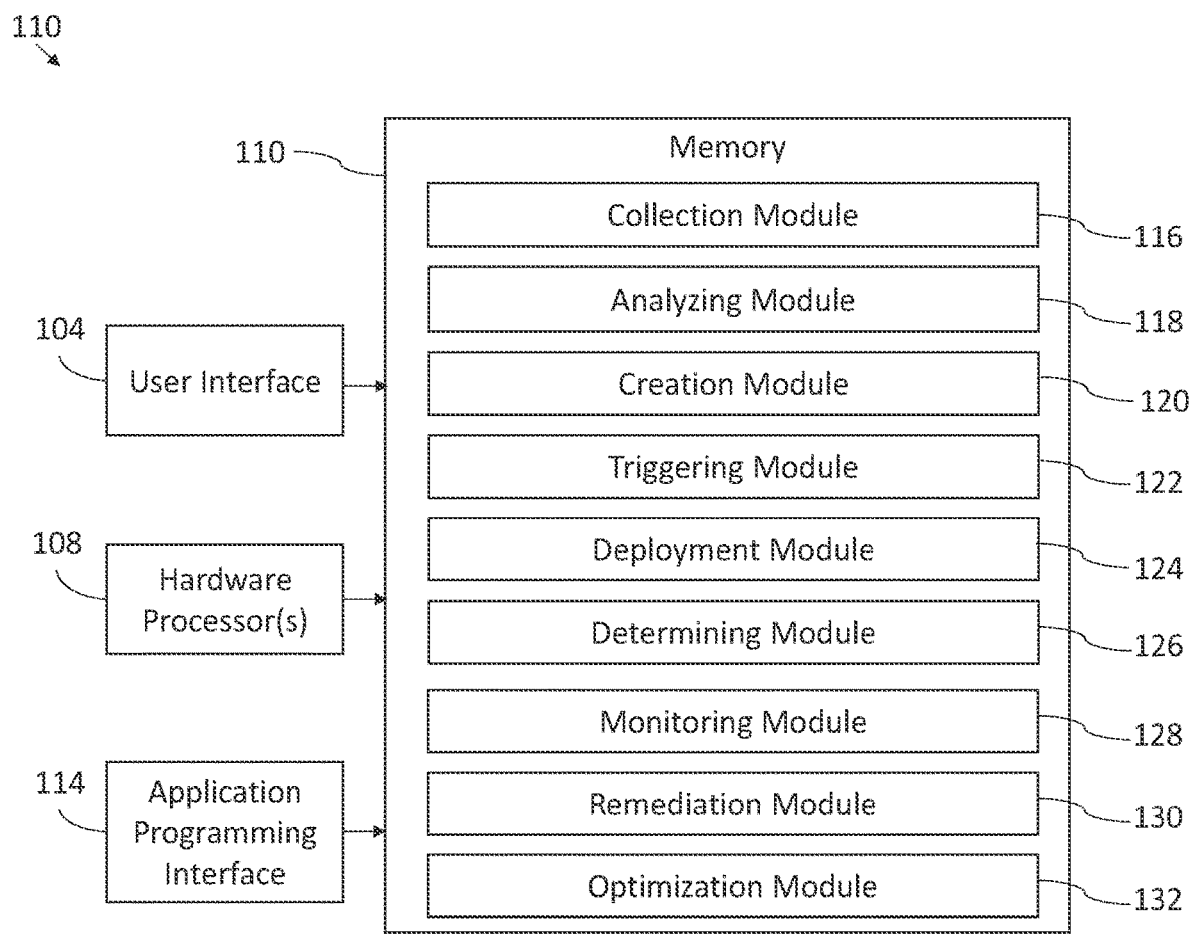
FIG. 2 a block diagram to illustrate a system to autonomously manage a hybrid IT infrastructure, in accordance with some embodiments of the present disclosure.

FIG. 2 illustrates a block diagram of the system 100 to autonomously manage the hybrid IT infrastructure. Wherein the memory 110 comprises a collection module 116, an analyzing module 118, a creation module 120, a triggering module 122, a deployment module 124, a determining module 126, a monitoring module 128, a remediation module 130, and an optimization module 132. The IT infrastructure comprises of the following:

On-premise Data Center: This refers to the traditional compute, storage, network infrastructure, and the related technologies like virtualization. The deployment could be as bare metal, virtualized via traditional methods or as Software defined infrastructure, Private Cloud.

Cloud: This refers to the Infrastructure as a service (IaaS), resources subscribed from Public Cloud services.

Edge: The Edge computing infrastructure wherein the compute, storage and networking required to provide computational capability at the Edge locations. The Edge computing is defined as the computing infrastructure deployed at the source of data (e.g. IoT devices, manufacturing plant, mines, traffic signals, retail shop etc. where data is being generated in the form of sensor data, images, user information and so on).

Figure 3:
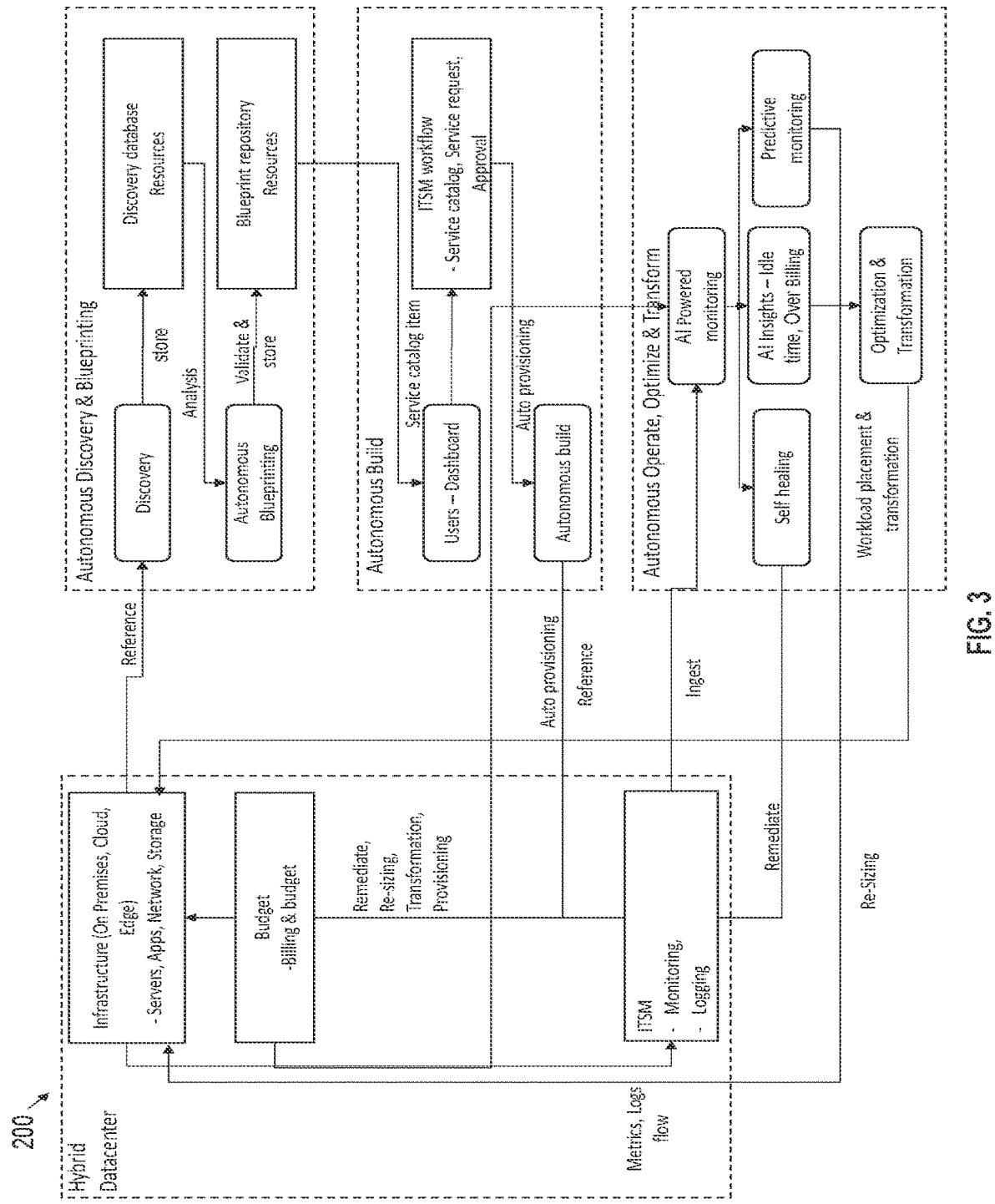
FIG. 3 is a function flow diagram of the system covers one or more phases in the IT infrastructure life cycle, in accordance with some embodiments of the present disclosure.

Referring FIG. 3, wherein a block diagram 200 of the system 100 covers one or more phases in the IT infrastructure life cycle such as discovery of one or more components of infrastructure resources such as, but not limited to, compute, storage, network, load balancers, and one or more platform software and their inter-connectivity. Further, the system 100 is configured to build a self-service portal, business dashboards, approval workflows, provision to required one or more applications and platform workload, and the workload placement automatically. The system 100 uses an artificial intelligence (AI) based full stack monitoring to detect operational issues in metrics and predict based on a forecast metrics. Further, the system 100 is configured for one or more autonomous operations including auto-remediation and self-healing and perform right sizing of compute and storage resources of future need. The system 100 is also configured to provide optimization suggestions such as cost optimization and capacity optimization based on metrics. It is to be noted that based on various factors the system 100 transforms the virtual machine-based applications into a container-based application.

In one example, wherein a service catalogue is a development environment for an inventory application for a retail customer. The service catalogue constitutes a multitier architecture includes but not limited to, load balancer, couple of web servers and a database server. It would be appreciated that a service request for the IT infrastructure provisioning is a common task which is requested frequently. On approval of the service request, the deployment of the requested catalogue is handed over for an automated build.

In the preferred embodiment of the disclosure, the collection module 116 of the system 100 collects one or more information of the IT infrastructure using a discovery model. Wherein, the one or more information includes at least one Infrastructure platform, at least one environment for one or more applications, and capacity, configuration, and connectivity of each of one or more components of the IT infrastructure. Herein, the discovery model runs one or more commands either remotely or on the IT infrastructure to collect one or more information of capacity, configuration, and connectivity. The discovery model maintains the collected information in a discovery database. It is to be noted that any sensitive information is stored into a sensitive infrastructure metadata (SIM), in an encrypted format. The sensitive information is excluded from an actual blueprint. The discovery model is capable to update the configuration if a configuration management database is configured to do so. Further, the system is configured to additionally update the Configuration Management Database (CMDB), if configured to do so via an API integration into the CMDB tool.

In the preferred embodiment of the disclosure, the analyzing module 118 of the system 100 is configured to analyze the collected one or more information of the IT infrastructure to identify type of entities. Herein the identified entities include infrastructure, operating system running processes, at least one platform software, and a plurality of configuration files and directories. From the analysis outcome, a report is created to highlight non-standard packages, processes etc. to map with identified entities.

In the preferred embodiment of the disclosure, the creation module 120 of the system 100 is configured to create a blueprint for one or more business applications in domain such as, but not limited to, retail, banking, etc. based on the analysis of collected one or more information. It is to be noted that the blueprint for each application for a particular type of environment herein refers to the infrastructure components required, their capacity, the steps to deploy, configure the infrastructure and steps to install, configure software to make the application environment functional. Therefore, the blueprint is created for an environment that comprises at least one operating software, one or more platform software, application details, contents of the configuration files and directories. The blueprint creation uses the collected one or more information to generate the blueprint of the infrastructure and save the blueprint data in appropriate formats (including JSON or CSV or YAML or other supporting formats) into a discovery database.

Figure 4:
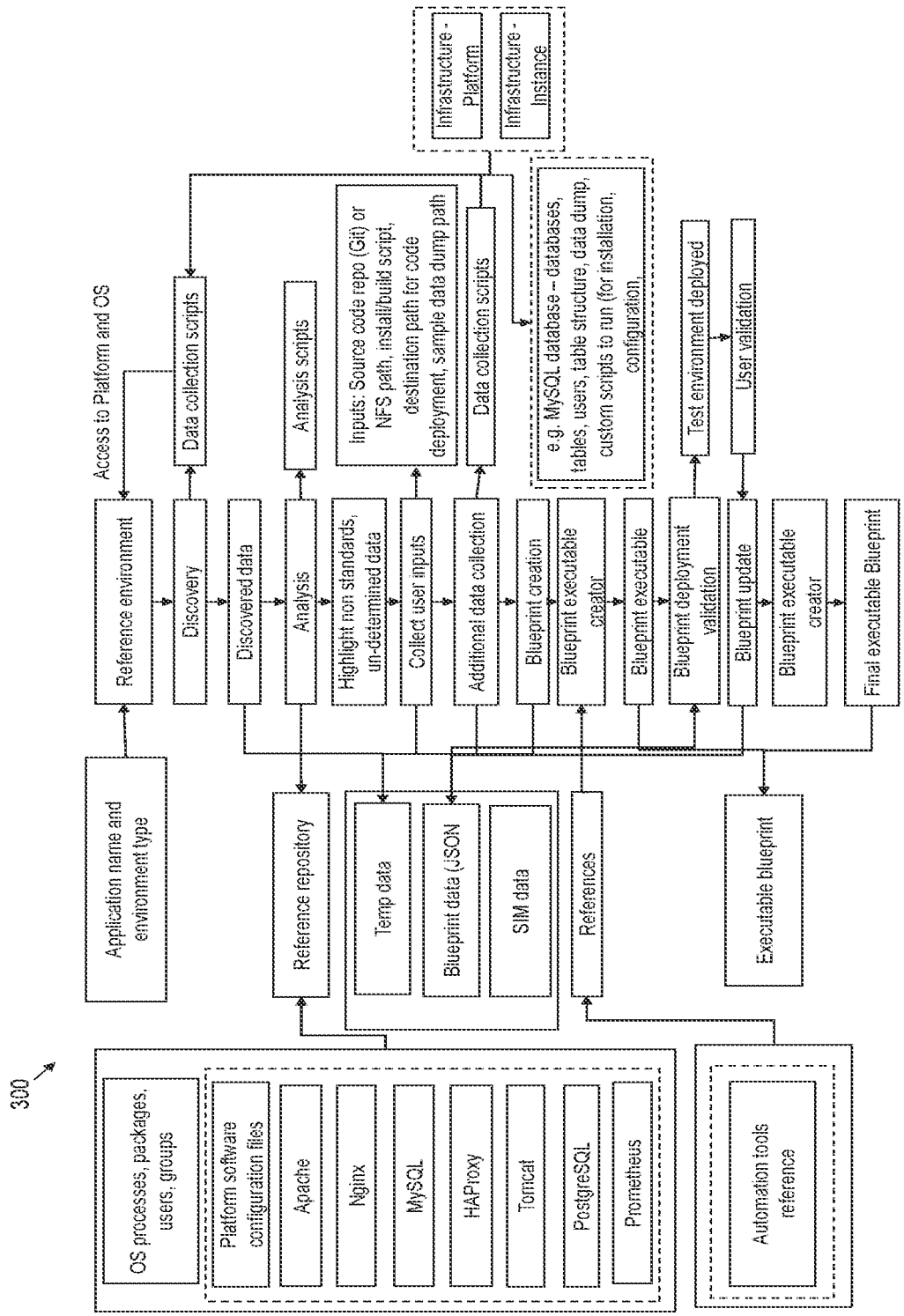
FIG. 4 a block diagram to illustrate the autonomous discovery and blueprinting of the IT infrastructure, in accordance with some embodiments of the present disclosure.

Referring FIG. 4, a block diagram 300 to illustrate the autonomous discovery and blueprinting of the IT infrastructure. Wherein, the automated blueprint creation uses a reference repository of the system to refer syntax and code creation guidelines for a specific automation model and automatically creates a blueprint executable (as an example, herein the blueprint executable refers to an ansible playbooks along with necessary roles, templates etc. if using the Ansible as an automation model). The blueprint executable is stored into the blueprint repository which is a version controlled. The blueprint creation captures provisioning of IT infrastructure type (i.e. private cloud or public cloud), capturing possible geographical location of resources, type of resources, and support models like backup, monitoring and lightweight directory access protocol (LDAP). It is to be noted that the blueprint will not be hardcoded with any sensitive critical information of private or public cloud like virtualization center IP addresses and administrative usernames and passwords. Instead, to create resources, the blueprint looks up at such data from a separate autonomous infrastructure database (DB), which will store such information in encrypted format. This sensitive infra metadata (SIM) should not be confused with the existing configuration management database (CMDB) data which is actually an information of the entire IT inventory.

In the preferred embodiment of the disclosure, the triggering module 122 of the system 100 is configured to trigger a blueprint deployment for provisioning the created blueprint of the IT infrastructure. Herein, the provisioning includes verification of one or more applications of the IT infrastructure to determine capacity, data sensitivity, and localization requirement for each of the one or more applications. On successful verification and a decision of a target platform, the validated blueprint is used to perform a creation of the required IT infrastructure resources in the target platform and deployment of the application.

In the preferred embodiment of the disclosure, the deployment module 124 configured to deploy the validated blueprint of the IT infrastructure. It would be appreciated that the post deployment one or more tasks are performed comprises of LDAP integration, backup configuration, an agent installation. On completion of one or more task of successful deployment, the discovery database is updated, and notification is sent to the user with details of the request service.

In the preferred embodiment of the disclosure, the determining module 126 of the system 100 is configured to determine a workload placement on one or more instances of the IT infrastructure considering the deployed blueprint of the IT infrastructure. Herein, the one or more instances includes an on-premise, a private cloud, a public cloud, and an edge. It would be appreciated that a provisioning interface determines the workload placement on the one or more instances. Further, the workload deployment from one location to another, say on-premises to cloud, cloud to on-premises, cloud to cloud is based on multiple factors including, environment category (for example, Test, Development, SIT, Quality and Production), required infrastructure (for example, CPU, TPU, GPU, FPU, etc.), storage capacity, past capacity utilization trends, licenses, cloud pricing, data sensitivity, data locality, available capacity, end user regions, etc.

Figure 5:
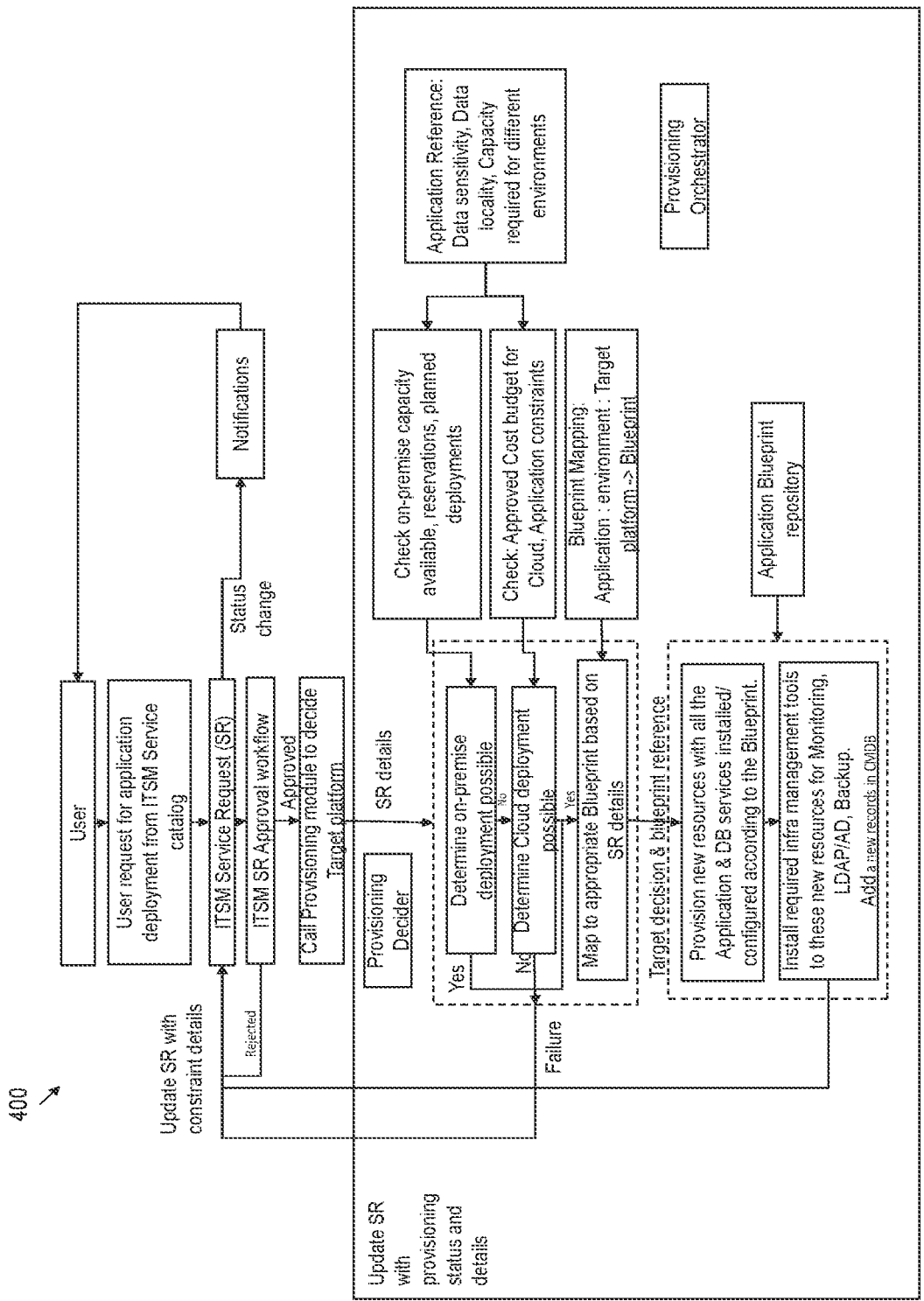
FIG. 5 a functional flow diagram to illustrate workload placement based on various factors, in accordance with some embodiments of the present disclosure.

Referring FIG. 5, a functional flow diagram 400, to illustrate an automated workload placement is based on one or more factors and the one or more factors are part of an Autonomous Infra Service Request (AISR) input. Herein, the one or more factors include an environment category, an infrastructure required, capacity planning, data sensitivity, and data locality. It would be appreciated that the one or more factors can be tailored specific to a customer, providing more flexibility and increase the dynamic nature of the system. Once the workload is decided, the availability of required infrastructure type, infrastructure quality and size are verified.

Figure 6:
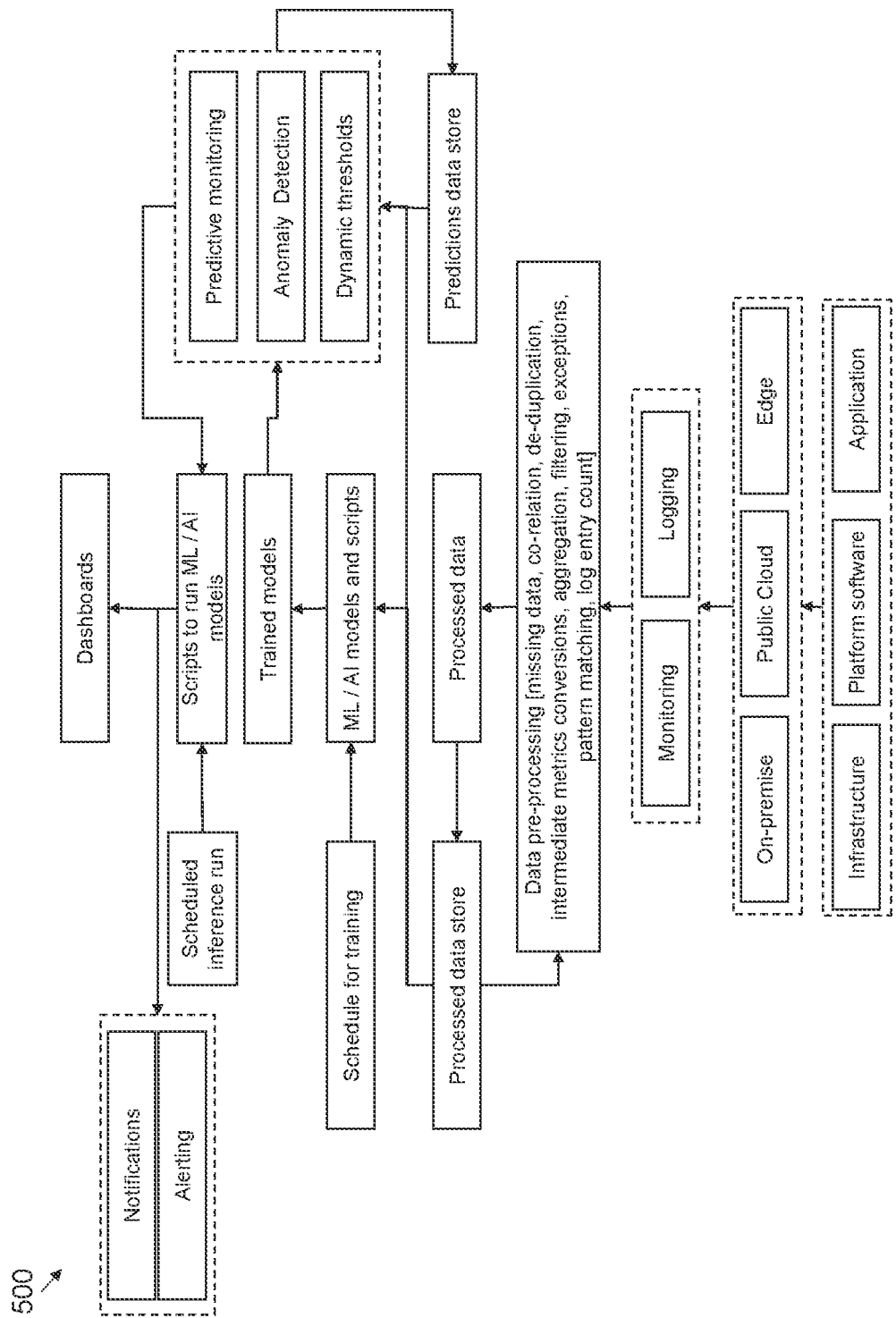
FIG. 6 is a schematic diagram flow chart to illustrate an AI enabled full stack monitoring, in accordance with some embodiments of the present disclosure.

Referring FIG. 6, a schematic flow chart 500, wherein the monitoring module 128 of the system 100 is enabled with artificial intelligence to monitor the deployed IT infrastructure and the one or more applications. Herein, the monitoring includes anomaly detection, advanced alerting, predict based on forecast metrics and perform noise reduction. A detailed monitoring of metrics and logs of IT infrastructure and one or more applications provides insights by means of dynamic thresholds. It is to be noted that the monitoring events creates an incident and is fed to autonomous operations. Further, the AI enabled monitoring also provides monitoring data insights to the optimization and transformation.

Figure 9:
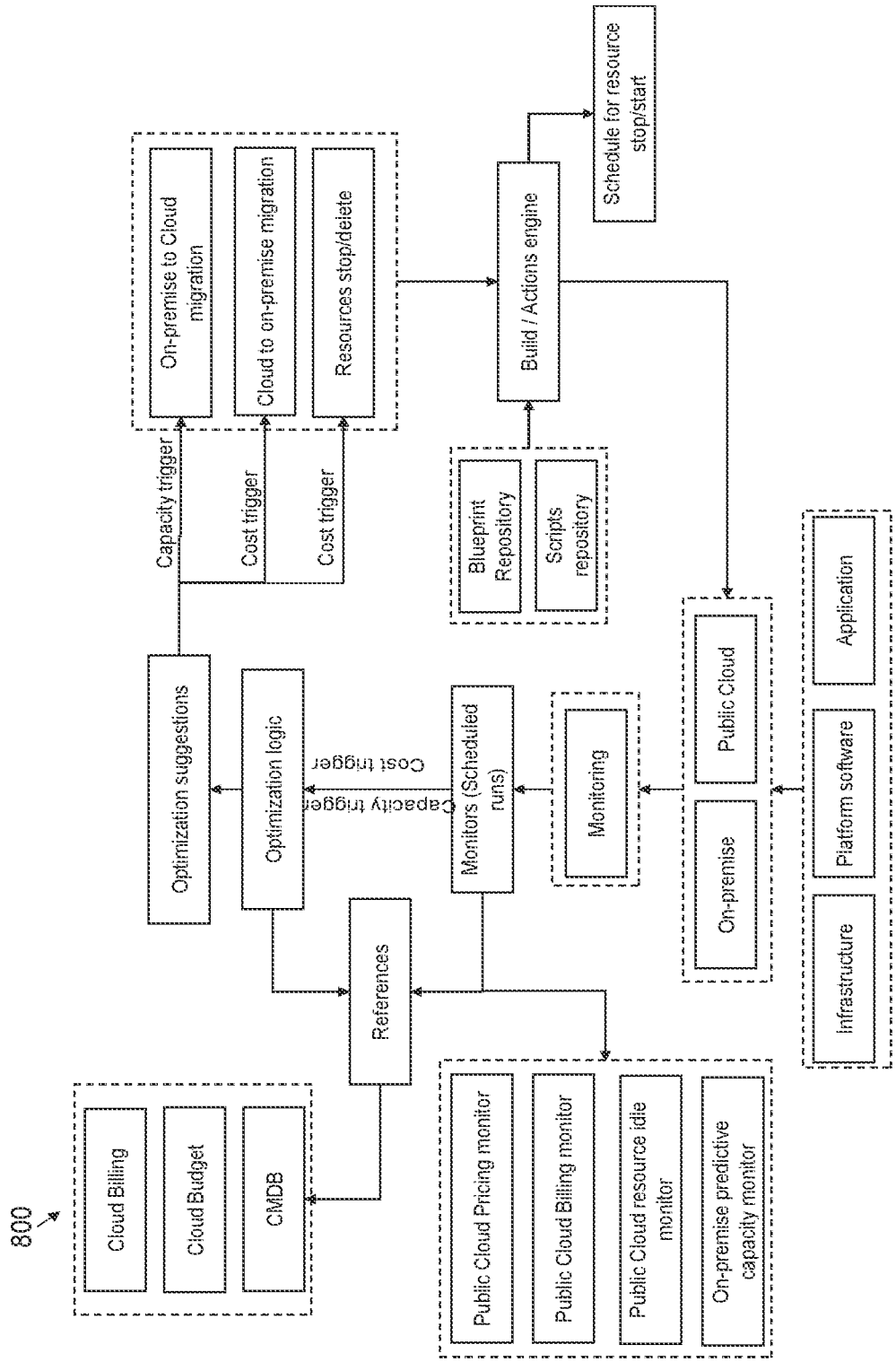
FIG. 9 illustrating optimization of the autonomous IT infrastructure, in accordance with some embodiments of the present disclosure.

It is to be noted that the monitoring gathers various infrastructure utilization metrics (for example, CPU, memory, disk, network). The monitoring also determines dynamic thresholds (high and low threshold based on acceptable tolerance/deviation from the utilization trend at that time of the day) from a predictive monitoring as shown in FIG. 9. Seasonality effects (e.g. high workload on weekdays or month end processing, low workload on weekends or holidays etc.) are considered when determining the dynamic thresholds. When the server utilization crosses dynamic threshold, an alert is sent to an alert management model. The Alert management model checks the details of the alert and on finding it to be generated from dynamic threshold breach, sends to incident creation model to create an incident. When an incident is created from the dynamic threshold breach, the resolution process is triggered to pick up the incident, checks for availability of automated resolution.

Figure 7:
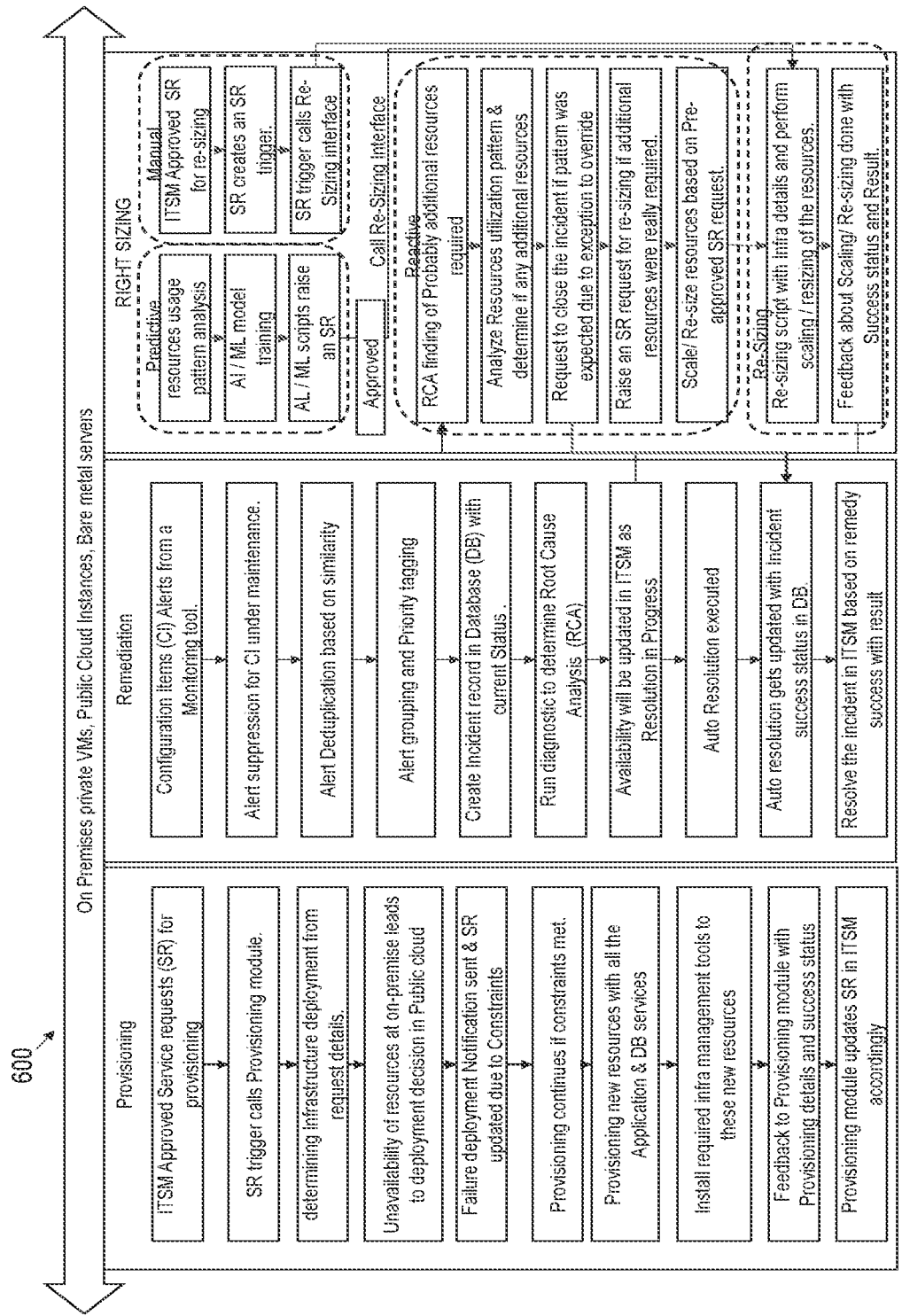
FIG. 7 is a functional block diagram to illustrate auto remediation, capacity resizing, and self-healing, in accordance with some embodiments of the present disclosure.

Referring FIG. 7, a functional flow diagram 600, wherein the remediation module 130 of the system 100 is configured to remediate one or more operational issues detected such as, but not limited to, a resource threshold breach, server and service down issues, link fluctuation etc., using an automated resolution procedure. Herein, the remediation is to resolve IT alerts or incidents, generated as a result of resource threshold breach, unusual behavior or anomaly detected, service or server down and link fluctuation etc. It is to be noted that the automated resolution procedure follows a dependency map of one or more instances of the IT infrastructure, perform auto remediation, capacity resizing, and self-healing as shown in the FIG. 8. The alerts or incidents are generated by AI enabled monitoring, application performance managers, and log analytics. It is to be noted that the alerts are ingested by appropriate modular programs as adapters. Each adapter is capable of ingesting the alert data by connecting to the alert source using a source specific protocol.

Figure 8:
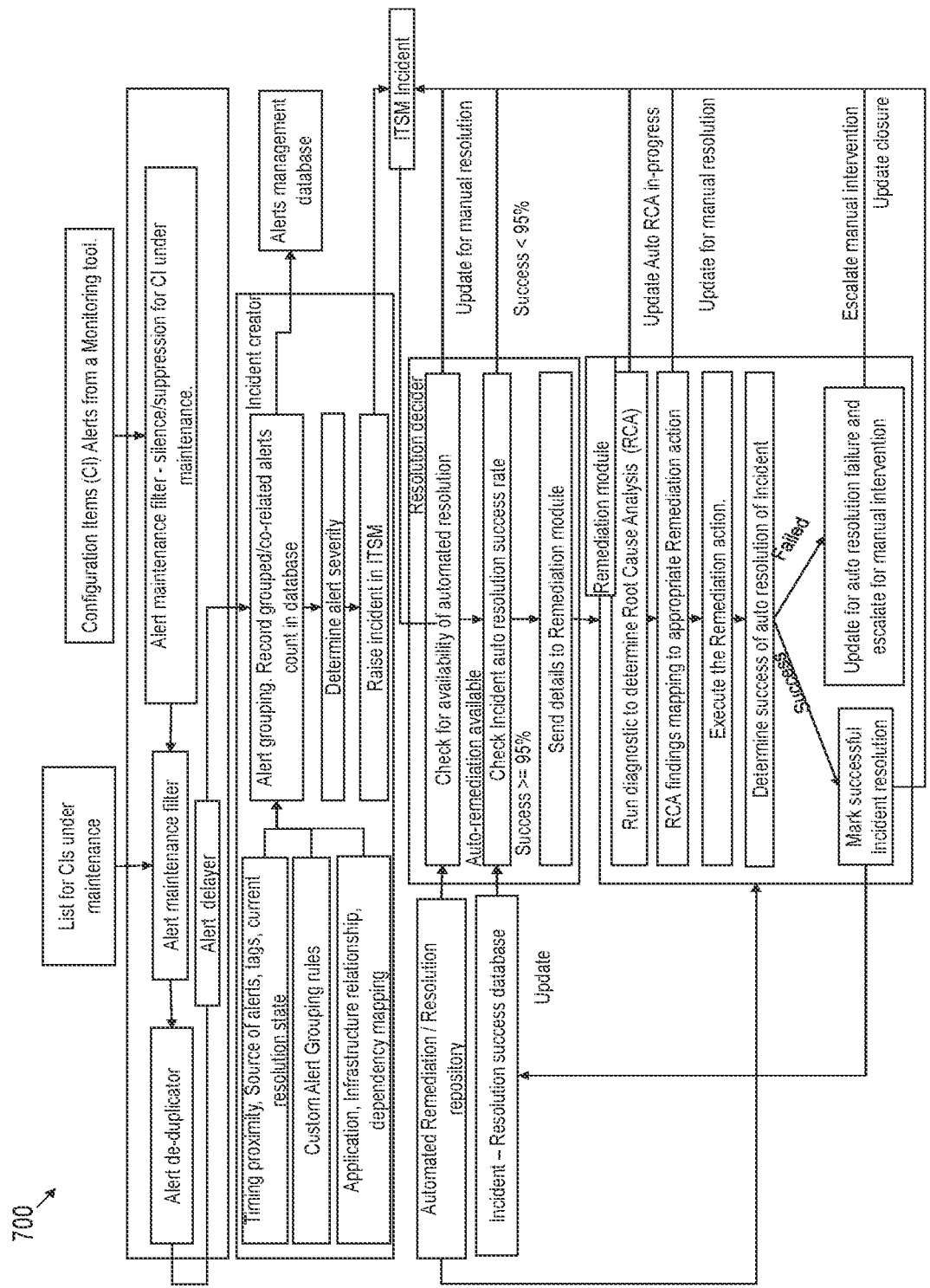
FIG. 8 is a functional block diagram to illustrate autonomous operations, in accordance with some embodiments of the present disclosure.

Referring FIG. 8, a functional block diagram 700 to illustrate autonomous operations. Herein, the ingested alerts are mapped with event field data like severity, application name, affected item, and affected item state. The mapped alerts are sent over to an alert suppressor model of the system. Based on the incident details, a root cause analysis (RCA) is carried by a specific set of instructions. The RCA looks up into identical incidents which had occurred and resolved earlier. Based on the RCA findings the auto remediation action is triggered with necessary inputs from the RCA. On execution of the auto remediation action, the resolution of the incident is determined which decides the success or failure of the auto remediation. Based on the outcome of this resolution, a detailed status is collated and updated in the database.

Furthermore, if the RCA findings result into conclusion that to resolve the incident, the size (capacity) of the server needs to be increased. The RCA triggers the execution of right sizing action. The right sizing instructions determine the resource (CPU, memory, disk, network) and platform on which the virtual machine is running (for example, on-premise) to determine the right size and then run the appropriate actions to take the right sizing action. On completion of the auto remediation, the success of the remediation is determined based on success or failure to change the capacity of the server.

In another aspect, wherein the right sizing aims at configuring the servers deployed as virtual machines on-premise or Public cloud instances with the right size (for example capacity, CPU, memory, disk, network) in order to cater to increased or decreased utilization (typically not for instantaneous but rather for ongoing pattern of increased/decreased utilization). It would be appreciated that intention here is to scale up or scale down the resources based on inputs from a predictive monitoring or reactive monitoring. The monitoring gathers various infrastructure utilization metrics (CPU, memory, disk, network). A daily scheduled action run to analyze these metrics data for the monitored servers, performs necessary data preprocessing such as rate conversion, missing values, outliers to create trained models. It is to be noted that by automating the tasks required to deploy and configure the infrastructure, platform software and application, huge efforts are saved along with benefits like consistency, reduced dependency on domain expertise, reduction/avoidance of human error.

In the preferred embodiment of the disclosure, the optimization module 132 of the system 100 is configured to optimize the deployed IT infrastructure based on result of monitored the deployed IT infrastructure and the one or more applications. Further, the optimization includes moving the workload to a cloud to make capacity available, scheduling a public cloud, and moving application environment from one cloud to another based on cloud pricing, data sensitivity, data locality, available capacity, end user regions, etc. and transforming one or more applications which are already running in virtual machines into container to improve resource efficiency and to reduce operating system (OS) license costs.

It would be appreciated that the infrastructure, the platform software, and applications deployed on-premises and on public cloud are getting monitored via monitoring module 128. There are one or more monitors which are scheduled to check change in cloud pricing, check for cloud billing for the cloud account where this solution is deployed, check if any public cloud resources are idle and check if on-premise predicted capacity is exceeding physical capacity of infrastructure on-premise. Therefore, the one or more monitors compare the monitored values with the reference of public cloud budget, public cloud billing for the account and trigger an alert. The trigger initiates the optimization module 132 to evaluate for any possible optimization suggestions.

Referring FIG. 9, illustrating optimization of the autonomous IT infrastructure 800. Herein, the on-premise non-critical application development is moved to a cloud in a case of capacity trigger. Scheduling the public cloud virtual machine instances of non-critical application's development environment to be shut down for the duration they are observed to be idle every day in case of cost trigger. Moving the application environment from one cloud to another in case of cloud pricing changing for a cloud provider and having considerable cost benefit. It is to be noted that the transformation helps to modernize the application deployments from virtual machine based to containers or containerized application. The decision is based on discovery of the application environment in terms of the software components, type of hardware used, inter-connectivity with other components/applications etc.

Referring FIG. 10, a processor-implemented method 900 to autonomously manage a hybrid IT infrastructure. The method comprises one or more steps as follows.

Initially, at the step 902, collecting one or more information of an existed IT infrastructure using a discovery model. Herein, the one or more information includes at least one infrastructure platform, at least one environment for one or more applications, and capacity, configuration, and connectivity of each of one or more components of the IT infrastructure. The discovery model runs one or more commands either remotely or on the IT infrastructure to collect one or more information of capacity, configuration, and connectivity. The discovery model maintains the collected information in a discovery database.

In the preferred embodiment of the disclosure, at the next step 904, the collected one or more information is analyzed based on one or more parameters to identify type of infrastructure, processes of one or more software, and a plurality of configuration files and directories of the IT infrastructure. The one or more parameters include, but not limited to, an operating software (OS) lookup running processes, an installed path of running processes, a network bindings and server/client connections of running processes, an installed paths mapping to computer file system and drive.

In the preferred embodiment of the disclosure, at the next step 906, creating a blueprint for one or more business applications in domain such as, but not limited to, retail, banking, etc. based on the analysis of collected one or more information. The blueprint creation uses the collected one or more information to generate the blueprint of the infrastructure and save the blueprint data in appropriate formats (including JSON or CSV or YAML or other supporting formats) into a discovery database.

In the preferred embodiment of the disclosure, at the next step 908, triggering a blueprint deployment for provisioning the created blueprint of the IT infrastructure. Herein, the provisioning includes verification of one or more applications of the IT infrastructure to determine capacity, data sensitivity, and localization requirement for each of the one or more applications. On successful verification and a decision of a target platform, the validated blueprint is used to perform a creation of the required IT infrastructure resources in the target platform and deployment of the application.

In the preferred embodiment of the disclosure, at the next step 910, deploying the validated blueprint of the IT infrastructure. It would be appreciated that the post deployment one or more tasks are performed comprises of lightweight directory access protocol (LDAP) integration, backup configuration, an agent installation. On completion of one or more task successfully the discovery database is updated, and notification is sent to the user with details of the request service.

In another embodiment, a workload placement is determined on one or more instances of the deployed IT infrastructure. Herein, the one or more instances includes an on-premise, a private cloud, a public cloud, and an edge. It would be appreciated that a provisioning interface determines the workload placement on the one or more instances.

In the preferred embodiment of the disclosure, at the next step 912, monitoring the deployed IT infrastructure and the one or more applications using an artificial intelligence enabled monitoring module 128 of the system 100. Herein, the monitoring includes anomaly detection, advanced alerting, predict based on forecast metrics and perform noise reduction. A detailed monitoring of metrics and logs of IT infrastructure and one or more applications provides insights by means of dynamic thresholds. It is to be noted that the monitoring events then creates an incident and is fed to autonomous operations. Further, the AI enabled monitoring also provides monitoring data insights to the optimization and transformation.

In the preferred embodiment of the disclosure, at the next step 914, remediating one or more operational issues detected using an automated resolution procedure. The automated resolution procedure follows a dependency map of one or more instances of the IT infrastructure, perform auto remediation, capacity resizing and self-healing.

In the preferred embodiment of the disclosure, at the last step 916, optimizing the deployed IT infrastructure based on result of monitored the deployed IT infrastructure and the one or more applications. Further, the optimization includes moving the workload to a cloud to make capacity available, scheduling a public cloud, and moving application environment from one cloud to another based on cloud pricing, data sensitivity, data locality, available capacity, end user regions, etc. transform virtual machine based application into an Container based application.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem associated with optimization of a hybrid IT infrastructure autonomously. Herein an automated way of deploying an application by finding out the various aspects such as server instances, sizing, OS, software, configuration etc. and then from this information autonomously building the necessary instructions that can be used to deploy the application whenever required. After autonomously building the automation instructions through blueprinting, one important step is to validate that the automation instructions have been created appropriately and to do so the solution trigger the blueprint deployment (i.e. run these instructions to build an instance of the application). Thus, instead of traditional way of person(s) writing automation instructions to deploy an application, here the solution is building the instructions autonomously, through blueprinting. The self-optimizing IT infrastructure with intelligent techniques to detect changes in the environment and proactively adjust in real time to accommodate the business requirements of various applications based on their level of criticality, preventing unexpected failures and disaster events.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device, which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development would change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising:
   collecting, via one or more hardware processors, information associated with an information technology (IT) infrastructure using a discovery model, wherein the information includes at least one infrastructure platform, at least one environment for one or more applications, and capacity, configuration and connectivity of one or more components of the IT infrastructure; running one or more commands in a remote manner or on the IT infrastructure to collect information related to the capacity, the configuration, and the connectivity for the one or more applications, wherein the collected information is maintained in a discovery database and sensitive information is stored into a Sensitive Infrastructure Metadata (SIM) in an encrypted format and the sensitive information is excluded from a blueprint of the one or more applications, and wherein the sensitive information is at least one of virtualization center Internet Protocol (IP) addresses, administrative usernames and administrative passwords;

analyzing, via the one or more hardware processors, the collected information of the IT infrastructure based on one or more parameters to identify processes of one or more software, and a plurality of configuration files and directories of the IT infrastructure;

creating, via the one or more hardware processors, the blueprint of the one or more business applications based on the analysis of the collected information, wherein the blueprint creation for an environment includes determining type and name of an operating software, application image, application dependency and installation location of one or more files and directories;

triggering, via the one or more hardware processors, a blueprint to validate the required IT infrastructure by determining the capacity required against the capacity available, localize the IT infrastructure and application deployment whether at on-premises datacenter or public clouds;

deploying, via the one or more hardware processors, the validated blueprint to provision the required IT infrastructure and the one or more applications, and perform post installation tasks;

monitoring, via one or more processors, the deployed blueprint of the one or more applications using an artificial intelligence (AI) enabled monitoring module, wherein the monitoring includes detection of one or more operational issues;

remediating, via the one or more hardware processors, the detected one or more operational issues using an automated resolution procedure, wherein the automated resolution procedure follows a dependency map of one or more instances of the IT infrastructure to perform an auto remediation of the issues and building a self-service portal, business dashboards, approval workflows, provision to the one or more applications, platform workload and workload placement automatically and using an Artificial Intelligence (AI) based full stack monitoring to detect the one or more operational issues in metrics; and optimizing, via the one or more hardware processors, the deployed IT infrastructure based on results of the deployed blueprint of the one or more applications, wherein the optimizing includes moving the platform workload from one location to another location, wherein the one location to the another location is at least one of on-premises to cloud, the cloud to the on-premises, the cloud to a second cloud, wherein the moving of the platform workload is based on one or more factors, the one or more factors being at least one of environment category required infrastructure storage capacity, past capacity utilization trends, licenses, cloud pricing, data sensitivity, data locality, available capacity, and end user regions and wherein the optimization includes transforming a virtual machine-based application into a container-based application.

2. The processor-implemented method of claim 1, wherein the one or more parameters include installed paths of running processes, network bindings and server/client connections of running processes, installed paths mapping to computer file system and drive.

3. The processor-implemented method of claim 1, wherein the blueprint creation includes provisioning of the IT infrastructure type capturing geographical location of resources, type of resources monitoring backup, and lightweight directory access protocol (LDAP).

4. The processor-implemented method of claim 1, wherein the monitoring of the deployed blueprint includes gathering infrastructure utilization metrics, and determining dynamic thresholds based on seasonality effects.

5. The processor-implemented method of claim 1, wherein automated resolution procedure triggers a root cause analysis (RCA) to check one or more identical incidents occurred and resolved earlier.

6. A system (100) comprising:
an input/output interface for collecting information associated with an information technology (IT) infrastructure using a discovery model, wherein the information includes at least one infrastructure platform, at least one environment for one or more applications, and capacity, configuration and connectivity of one or more components of the IT infrastructure;
at least one application programming interface (API);
one or more hardware processors;
at least one memory in communication with the one or more hardware processors, wherein the one or more hardware processors are configured to execute one or more programmed instructions stored in the memory, to:
run one or more commands in a remote manner or on the IT infrastructure to collect information related to the capacity, the configuration, and the connectivity for the one or more applications, wherein the collected information is maintained in a discovery database and sensitive information is stored into a Sensitive Infrastructure Metadata (SIM) in an encrypted format and the sensitive information is excluded from a blueprint of the one or more applications, and wherein the sensitive information is at least one of virtualization center Internet Protocol (IP) addresses, administrative usernames and administrative passwords;
analyze the collected information of the IT infrastructure to identify type and capturing possible geographical location of the infrastructure, running processes, at least one platform software, and a plurality of configuration files and directories;
create a blueprint using an automated procedure of one or more applications for the one or more business applications in a domain based on the analysis of collected information, wherein the blueprint creation for an environment includes determining type and name of an operating software, application image, application dependency and installation location of one or more files and directories;
trigger to validate the required IT infrastructure by determining the capacity required against the capacity available, localize the IT infrastructure and application deployment whether at on-premises datacenter or public clouds;
deploy the validated blueprint to provision the required IT infrastructure and the one or more applications, and perform post installation tasks;
monitor the deployed blueprint of the one or more applications using an artificial intelligence (AI) enabled monitoring module, wherein the monitoring includes detection of one or more operational issues;
remediate the detected one or more operational issues using an automated resolution procedure, wherein the automated resolution procedure follows a dependency map of one or more instances of the IT infrastructure to perform an auto remediation and building a self-service portal, business dashboards, approval workflows, provision to the one or more applications, platform workload and workload placement automatically and using an Artificial Intelligence (AI) based full stack monitoring to detect the one or more operational issues in metrics; and
optimize the deployed IT infrastructure based on results of the deployed blueprint of the one or more applications, wherein the optimizing includes moving the platform workload from one location to another location, wherein the one location to the another location is at least one of on-premises to cloud, the cloud to the on-premises, the cloud to a second cloud, wherein the moving of the platform workload is based on one or more factors, the one or more factors being at least one of environment category required infrastructure storage capacity, past capacity utilization trends, licenses, cloud pricing, data sensitivity, data locality, available capacity, and end user regions and wherein the optimization includes transforming a virtual machine-based application into a container-based application.

7. A non-transitory computer readable medium storing one or more instructions which when executed by a processor on a system cause the processor to perform a method comprising:
collecting, via one or more hardware processors, information associated with an information technology (IT) infrastructure using a discovery model, wherein the information includes at least one infrastructure platform, at least one environment for one or more applications, and capacity, configuration and connectivity of one or more components of the IT infrastructure;
running one or more commands in a remote manner or on the IT infrastructure to collect information related to the capacity, the configuration, and the connectivity for the one or more applications, wherein the collected information is maintained in a discovery database and sensitive information is stored into a Sensitive Infrastructure Metadata (SIM) in an encrypted format and the sensitive information is excluded from a blueprint of the one or more applications, and wherein the sensitive information is at least one of virtualization center Internet Protocol (IP) addresses, administrative usernames and administrative passwords;
analyzing, via the one or more hardware processors, the collected information of the IT infrastructure based on one or more parameters to identify processes of one or more software, and a plurality of configuration files and directories of the IT infrastructure;
creating, via the one or more hardware processors, the blueprint of the one or more business applications based on the analysis of the collected information, wherein the blueprint creation for an environment includes determining type and name of an operating software, application image, application dependency and installation location of one or more files and directories;

triggering, via the one or more hardware processors, a blueprint to validate the required IT infrastructure by determining the capacity required against the capacity available, localize the IT infrastructure and application deployment whether at on-premises datacenter or public clouds;

deploying, via the one or more hardware processors, the validated blueprint to provision the required IT infrastructure and the one or more applications, and perform post installation tasks;

monitoring, via one or more processors, the deployed blueprint of the one or more applications using an artificial intelligence (AI) enabled monitoring module, wherein the monitoring includes detection of one or more operational issues;

remediating, via the one or more hardware processors, the detected one or more operational issues using an automated resolution procedure, wherein the automated resolution procedure follows a dependency map of one or more instances of the IT infrastructure to perform an auto remediation of the issues and building a self-service portal, business dashboards, approval workflows, provision to the one or more applications, platform workload and workload placement automatically and using an Artificial Intelligence (AI) based full stack monitoring to detect the one or more operational issues in metrics; and optimizing, via the one or more hardware processors, the deployed IT infrastructure based on results of the deployed blueprint of the one or more applications, wherein the optimizing includes moving the platform workload from one location to another location, wherein the one location to the another location is at least one of on-premises to cloud, the cloud to the on-premises, the cloud to a second cloud, wherein the moving of the platform workload is based on one or more factors, the one or more factors being at least one of environment category required infrastructure storage capacity, past capacity utilization trends, licenses, cloud pricing, data sensitivity, data locality, available capacity, and end user regions and wherein the optimization includes transforming a virtual machine-based application into a container-based application.

* * * * *